(12) United States Patent (10) Patent No.: US 9,154,026 B2
Schrom et al. (45) Date of Patent: Oct. 6, 2015

(54) BRIDGE DRIVER FOR A SWITCHING VOLTAGE REGULATOR WHICH IS OPERABLE TO SOFT-SWITCH AND HARD-SWITCH

(75) Inventors: Gerhard Schrom, Hillsboro, OR (US); Mark S. Milshtein, Portland, OR (US); Alexander Lyakhov, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 13/534,780

(22) Filed: Jun. 27, 2012

(65) Prior Publication Data

US 2014/0002049 A1 Jan. 2, 2014

(51) Int. Cl.
*G05F 1/563* (2006.01)
*H02M 1/08* (2006.01)
*H02M 3/158* (2006.01)
*H02M 3/338* (2006.01)

(52) U.S. Cl.
CPC .............. *H02M 1/08* (2013.01); *H02M 3/1588* (2013.01); *H02M 3/338* (2013.01); *Y02B 70/1466* (2013.01)

(58) Field of Classification Search
USPC .................. 323/235, 238, 240–244, 246, 266, 323/270–271, 282–285, 311, 312, 901, 908
See application file for complete search history.

(56) References Cited

U.S. PATENT DOCUMENTS

| | | | | |
|---|---|---|---|---|
| 5,180,964 A * | 1/1993 | Ewing | ............................. | 323/222 |
| 5,479,089 A * | 12/1995 | Lee | ............................... | 323/283 |
| 5,666,045 A * | 9/1997 | Grodevant | .................... | 323/282 |
| 5,679,953 A * | 10/1997 | Ananth et al. | .............. | 250/338.1 |
| 6,249,112 B1 * | 6/2001 | Khouri et al. | ................. | 323/282 |
| 6,369,556 B1 * | 4/2002 | Ohshima | ....................... | 323/282 |
| 6,798,256 B1 * | 9/2004 | Hazucha et al. | .............. | 327/111 |
| 6,838,863 B2 * | 1/2005 | Hazucha et al. | .............. | 323/282 |
| 6,933,711 B2 * | 8/2005 | Sutardja et al. | ............... | 323/283 |
| 6,944,034 B1 * | 9/2005 | Shteynberg et al. | ....... | 363/21.13 |
| 7,015,720 B2 | 3/2006 | Schrom et al. | | |
| 7,259,614 B1 * | 8/2007 | Baker et al. | .................... | 327/538 |
| 7,274,181 B2 * | 9/2007 | Schrom et al. | ................ | 323/284 |
| 7,358,770 B2 * | 4/2008 | Schrom et al. | .................. | 326/82 |
| 7,602,257 B2 | 10/2009 | Schrom et al. | | |

(Continued)

OTHER PUBLICATIONS

First Notification for Rectification issued for Chinese Patent Application No. 201320374293.0, mailed Oct. 14, 2013, 4 pages.

(Continued)

*Primary Examiner* — Adolf Berhane
*Assistant Examiner* — Nusrat Quddus
(74) *Attorney, Agent, or Firm* — Blakely, Sokoloff, Taylor & Zafman LLP

(57) ABSTRACT

Described is an apparatus which comprises: a low-side switch coupled to an output node for providing regulated voltage supply; and a first driver operable to cause the low-side switch to turn off when the output node rises above a first transistor threshold voltage. Described is also a voltage regulator which comprises: a signal generator to generate a pulse-width modulated (PWM) signal; a bridge having a low-side switch coupled to an output node for providing regulated voltage supply according to the PWM signal; a first driver operable to cause the low-side switch to turn off when the output node rises above a first transistor threshold voltage; and a bridge controller to provide control signals to the first driver. The voltage regulator may operate without diode clamps and its operation is self-timed. The voltage regulator also provides tolerance against process variation.

28 Claims, 12 Drawing Sheets

(56) References Cited

U.S. PATENT DOCUMENTS

| | | | |
|---|---|---|---|
| 7,649,384 B2* | 1/2010 | Ho et al. | 326/83 |
| 7,710,093 B2* | 5/2010 | Dwarakanath et al. | 323/282 |
| 7,728,568 B1 | 6/2010 | Jain | |
| 8,212,536 B2* | 7/2012 | Burns et al. | 323/224 |
| 8,593,128 B2* | 11/2013 | Burns et al. | 323/288 |
| 2004/0036458 A1 | 2/2004 | Johnson et al. | |
| 2006/0273774 A1 | 12/2006 | Galinski, III | |
| 2007/0210772 A1* | 9/2007 | Sawtell | 323/282 |
| 2008/0100371 A1* | 5/2008 | Paillet et al. | 327/543 |
| 2008/0143408 A1 | 6/2008 | Paillet et al. | |
| 2009/0167274 A1 | 7/2009 | Chien et al. | |
| 2009/0273329 A1 | 11/2009 | Ishino | |
| 2014/0266119 A1 | 9/2014 | Burton et al. | |

OTHER PUBLICATIONS

Notification of Transmittal of the International Search Report and the Written Opinion of the International Searching Authority issued for International Patent Application No. PCT/US2013/043484, mailed Sep. 27, 2013.

Office Action issued for Chinese Patent Application No. 201320374293.0, mailed Mar. 13, 2014, 4 pages.

Notification Concerning Transmittal of International Preliminary Report on Patentability issued for International Patent Application No. PCT/US2013/043484, mailed Jan. 8, 2015, 11 pages.

\* cited by examiner

1 …

BRIDGE DRIVER FOR A SWITCHING VOLTAGE REGULATOR WHICH IS OPERABLE TO SOFT-SWITCH AND HARD-SWITCH

BACKGROUND

Voltage regulators (VRs) are used to provide regulated voltage to a circuit. Discrete VRs include diode clamps such as Schottky diode clamps. However, these diode clamps suffer from reliability issues. Additionally, such discrete VRs may not easily be implemented on the same die as a processor.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
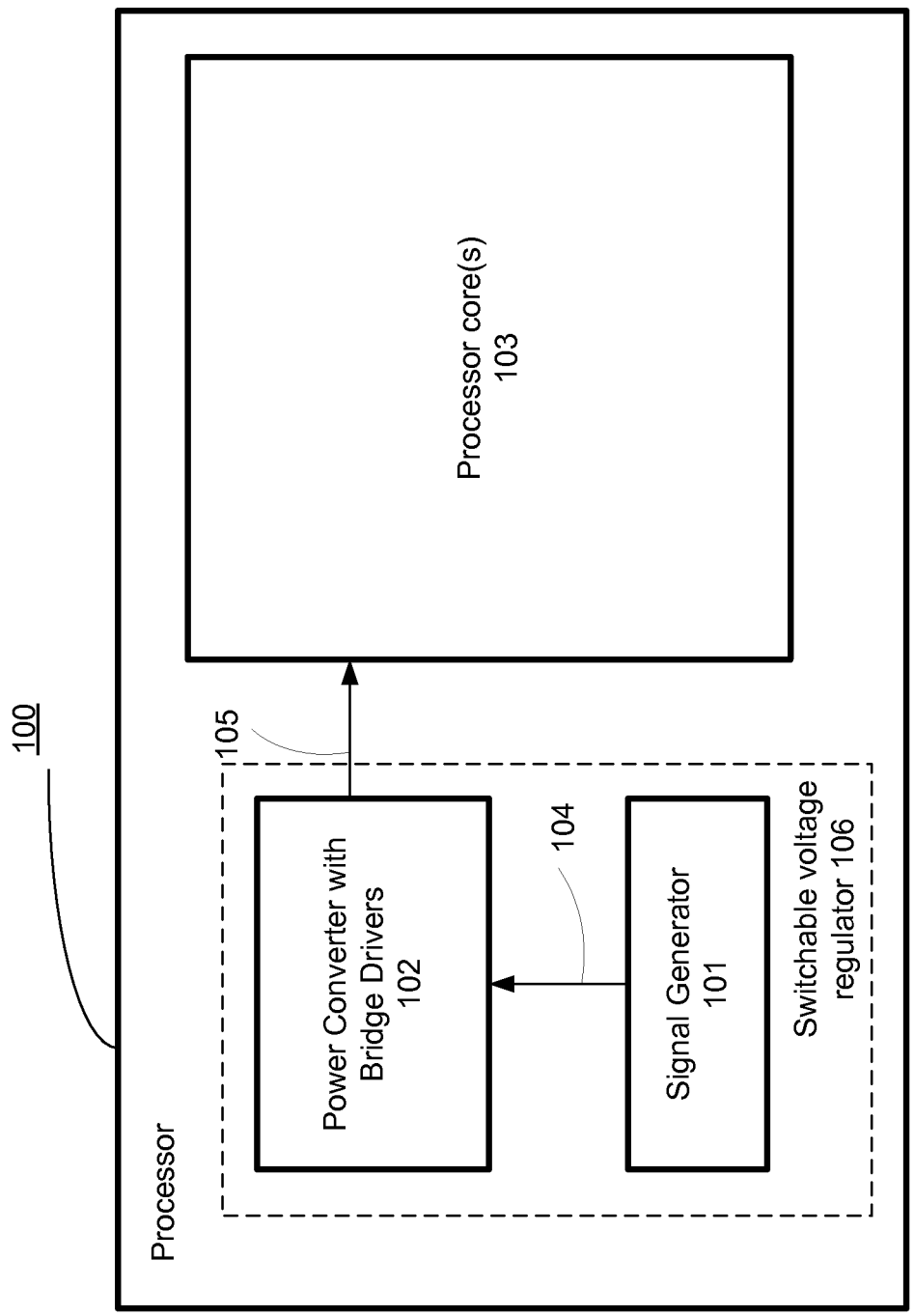
FIG. 1 is a high level architecture of a processor with an integrated switching voltage regulator, according to one embodiment of the disclosure.

Discrete voltage regulators (VRs) include diode clamps such as Schottky diode clamps. However, these diode clamps suffer from reliability issues. Additionally, such discrete VRs may not easily be implemented on the same die as a processor. Operating traditional VRs at high frequencies e.g., 100 MHz presents a challenge because VR controller circuits, driver circuits, and power transistors or bridge modules currently available for VRs are limited to frequencies of a few MHz (well below 100 MHz).

Disclosed herein is a bridge driver for a switching voltage regulator, according to one embodiment. In one embodiment, the switching voltage regulator is implemented on a same semi-conductor die having the processor. The bridge driver receives a modulated input signal, for example, a pulse width modulated (PWM) signal, and drives a bridge having a low-side switch and a high-side switch to generate a regulated power supply for a load (e.g., a processor core).

In the embodiments discussed herein the bridge driver comprises an N-type driver and a P-type driver to drive the low-side and the high-side switches respectively. In one embodiment, the low-side and the high-side switches are coupled to an output node which is coupled to an inductor, where the N-type driver and a P-type driver are self-timed to drive their corresponding low-side and the high-side bridge switches such that reverse current from the inductor to the low-side switch is used to initially charge the output node to reduce power consumed by the low-side switch.

In such an embodiment, magnetic energy from the inductor is converted to electric energy to timely pre-charge the output node before the P-type driver is turned on to fully charge the output node. In one embodiment, the self-timed circuit comprises the low-side switch, the high-side switch, and the corresponding bridge drivers coupled to the low-side and high-side switches, form a stable control loop that may be less sensitive to process variations and current variations in the load coupled to the inductor.

In the embodiments discussed herein, the bridge drivers are operable to soft-switch and/or hard-switch their respective low-side and high-side switches.

The term "soft-switch" herein generally refers to switching on or off one of the low-side or high-side switches before the other bridge switches off or on. During soft-switching reverse inductor current is used to pre-charge the output node coupled to the inductor so that the low-side or high-side switches can be turned on later than needed, thus saving power consumption.

The term "hard-switch" herein generally refers to turning on or off the low-side or high-side switches irrespective of whether the bridge output node has been pre-charged or not. Hard-switching is generally enabled when the load currents are high, e.g., twice the normal load current.

The above technical effects are not limiting in any way. Other technical effects are contemplated by the embodiments discussed herein.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things or devices, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on".

The term "substantially," "close to," "approximately," or "about" herein refer to being within 20% of the target value.

For purposes of the embodiments described herein, the transistors are metal oxide semiconductor (MOS) transistors, which include drain, source, gate, and bulk terminals. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The terms "MN" herein indicates an n-type transistor (e.g., NMOS, NPN BJT, etc) and the term "MP" indicates a p-type transistor (e.g., PMOS, PNP BJT, etc).

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 is a high level architecture of a processor 100 with an integrated voltage regulator (IVR), according to one embodiment of the disclosure. The term "integrated voltage regulator" refers to incorporating the voltage regulator in the same die as the load. However, the scope of the embodiments is not limited to an integrated voltage regulator. The embodiments discussed herein can also apply to discrete voltage regulators which are not fabricated on the same semiconductor die as the load which received the regulated voltage from the voltage regulator.

In one embodiment, the processor 100 is a single semiconductor die and may have one or more processor core(s) 103 and one or more IVRs 106 comprising a signal generator 101 coupled to a power converter (e.g., DC-DC converter) 102 with one or more bridge drivers. In one embodiment, the signal generator 101 is a PWM signal generator that generates a PWM signal 104 with an adjustable duty cycle. In other embodiments other signal generators may be used to generate a periodic signal for the power converter 102. For example, a PFM (pulse frequency modulation) controller, a hysteretic controller, or a current-mode controller may be used in addition to or instead of the PWM based controller.

The term "duty cycle" herein refers to the ratio of high phase over low phase of a periodic signal. For example, a 50% duty cycle signal has a ratio of 1:1 of high phase to low phase. A 25% duty cycle signal has a high phase which is four times larger (in time domain) than its low phase.

In one embodiment, the output of the power converter 102 is a regulated voltage supply 105 which is provided to one or more processor core(s) 103 of the processor 100. Processor core(s) are hardware processing logic comprising one or more logic units of a single microprocessor. The processor core(s) may share a large memory cache (not shown) or may have associated memory caches (not shown) for one or more processor core(s).

In one embodiment, the power converter 102 includes a bridge controller to generate control signals used for turning on/off the bridge drivers, high-side and low side bridge drivers, bridges driven by the high-side and low side bridge drivers, and an output node coupled to an inductor-capacitor (LC) network. So as not to obscure the embodiments of the disclosure, a high-side and low-side bridge driver and its corresponding bridge switch are disclosed. A person skilled in the art would appreciate that multiple bridge drivers may be used with multiple bridges/switches to drive the output node to generate a regulator power supply Vcc 105.

Figure 2:
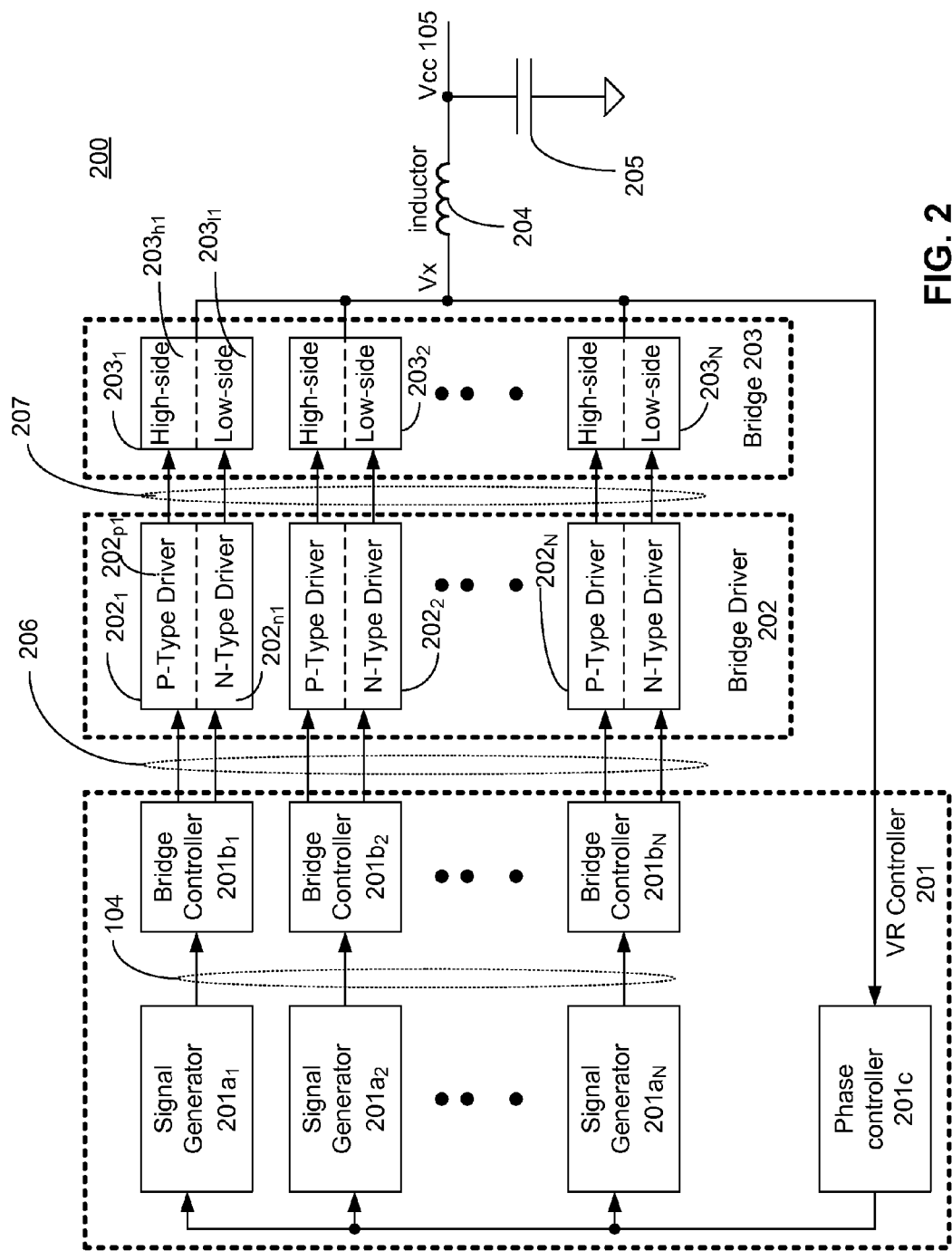
FIG. 2 is a high level architecture of a power converter of the switching voltage regulator, according to one embodiment of the disclosure.

FIG. 2 is a high level architecture of the switching voltage regulator 200/106, according to one embodiment of the disclosure. FIG. 2 is described with reference to FIG. 1. In one embodiment, the switching voltage regulator 200/106 comprises a VR controller 201, a bridge driver 202, a bridge 203, an inductor 204, and capacitor 205.

In one embodiment, the VR controller 201 comprises one or more signal generators $201a_{1-N}$, where 'N' is a positive integer. In one embodiment, the signal generators $201a_{1-N}$ are PWM generators generating one or more signals 104 with an adjustable duty cycle. In one embodiment, the VR controller 201 comprises one or more bridge controllers $201b_{1-N}$, where 'N' is a positive integer. In one embodiment, the one or more bridge controllers $201b_{1-N}$ generate control signals 206 to drive various components/devices of the bridge driver 202. Control signals 206 include, for example, signals indicating when to turn on or off the bridge drivers, when to soft switch the bridge drivers, when to hard switch the bridge drivers, etc. In one embodiment, the timing of the control signals i.e., when the control signals are generated, when they transition from logical high to low or vise-a-versa etc., determines overshoot on various circuit nodes and stress on the bridge 203 devices and amount of power consumed by the switchable voltage regulator 200/106.

In one embodiment, the VR controller 201 comprises a phase controller 201c which adjusts the duty cycle of the signal 104 according to the output voltage Vx on one end of the inductor 204. In one embodiment, the phase controller 201c is operable to select delay signals from a delay line to control the phases of the signal generators $201a_{1-N}$ to adjust the duty cycle of signal 104 and/or turn on or off phases of the signal generators $201a_{1-N}$.

In one embodiment, the bridge driver 202 includes one or more bridge drivers $202_{1-N}$, where 'N' is an integer. In one embodiment, bridge drivers $202_{1-N}$ are operable to receive control signals 206 from the corresponding bridge controllers $201b_{1-N}$ to generate signals 207 for driving the bridge 203. In one embodiment, the bridge 203 comprises one or more bridges $203_{1-N}$, where 'N' is an integer. The output from the one or more bridges $203_{1-N}$ is the output node Vx which drives the inductor 204 to generate a regulated power supply Vcc 105.

While the embodiment of FIG. 2 shows a single inductor 204, in some embodiments two or more inductors may be used. For example, each of the one or more bridges $203_{1-N}$ is coupled to a terminal of an inductor such that the other terminal of the inductor is coupled to a common node Vcc 105.

So as not to obscure the embodiments of the disclosure, a single instance of signal generator $201a_1$, bridge controller $201b_1$, bridge driver $202_1$, and bridge $203_1$ is discussed. The same explanation is applicable to other instances of the signal generators, bridge controllers, bridge drivers, and bridges.

In one embodiment, the bridge driver $202_1$ comprises a P-type driver $202_{p1}$ and an N-type driver $202_{n1}$. In one embodiment, the P-type driver $202_{p1}$ is operable to receive control signals 206 from the bridge controller $201_{b1}$ and controls when to turn on or off the high-side switch $203_{h1}$ of the bridge $203_1$. In one embodiment, the P-type driver $202_{p1}$ monitors the output voltage on node Vx to determine when to turn on/off the high-side switch $203_{h1}$. In one embodiment, the P-type driver $202_{p1}$ comprises a PMOS driver coupled to other PMOS and NMOS devices to control the PMOS driver for driving the high-side switch $203_{h1}$ of the bridge $203_1$.

In one embodiment, the N-type driver $202_{n1}$ is operable to receive control signals 206 from the bridge controller $201_{b1}$ and controls when to turn on or off the low-side switch $203_{l1}$ of the bridge $203_1$. In one embodiment, the N-type driver $202_{n1}$ monitors the output voltage on node Vx to determine when to turn on/off the low-side switch $203_{l1}$. In one embodiment, the N-type driver $202_{n1}$ comprises an NMOS driver coupled to other PMOS and NMOS devices to control the NMOS driver for driving the low-side switch $203_{l1}$ of the bridge $203_1$.

Figure 3:
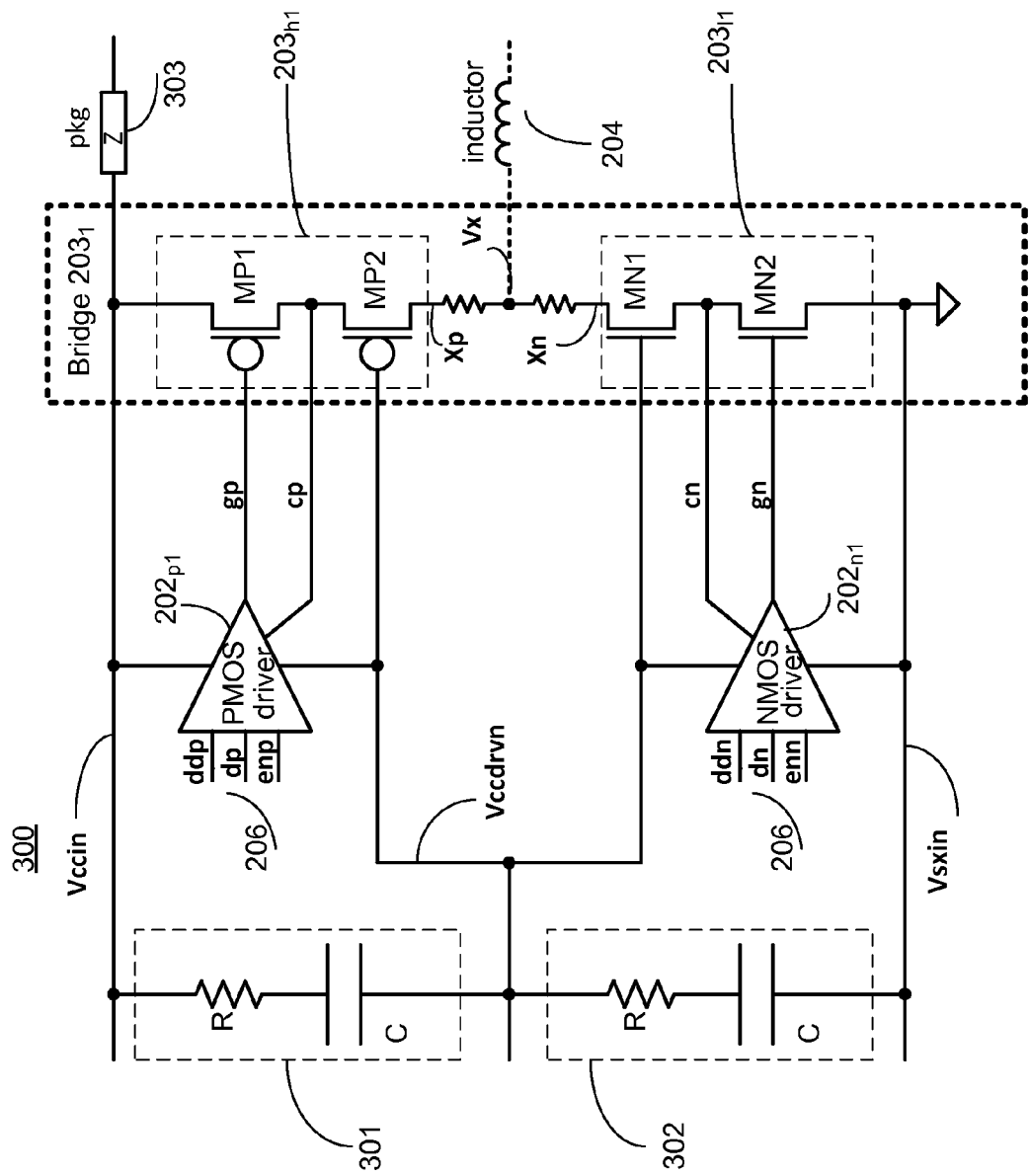
FIG. 3 is a portion of a switching voltage regulator with low-side and high-side bridges (or switches) and corresponding bridge drivers, according to one embodiment of the disclosure.

FIG. 3 is a portion of a switching voltage regulator 200/106 with a bridge $203_1$ having the low-side $203_{l1}$ and high-side $203_{h1}$ switches and corresponding bridge drivers, according to one embodiment of the disclosure. FIG. 3 is described with reference to FIG. 2.

In one embodiment, the high-side switch $203_{h1}$ comprises cascode P-devices. In one embodiment, the cascode P-devices are PMOS transistors MP1 and MP2, where the source terminal of MP1 is coupled to an input power supply Vccin and the drain terminal of MP1 is coupled to the source terminal (same as "cp") of MP2. In this embodiment, the drain terminal of MP2 is coupled to Vx, which is the output node coupled to one end of the inductor 204. In this embodiment, the gate terminal of MP1 is driven by the signal "gp" from the PMOS bridge driver $202_{p1}$.

The terms "signal" and "node" carrying that signal are interchangeably used in this disclosure. For example, node "gp" and signal "gp" are interchangeably used to refer to the voltage on that node or the signal on that node.

In one embodiment, the PMOS bridge driver $202_{p1}$ monitors the voltage level of "cp" to determine when to turn on or off MP1 via signal "gp." In one embodiment, the PMOS bridge driver $202_{p1}$ receives Vccdrvn, which is half-rail of Vccin. In one embodiment, Vccdrvn is used as a low power supply for the PMOS bridge driver $202_{p1}$. In one embodiment, the half-rail Vccdrvn is stabilized by the decoupling voltage divider network 301 and 302. In one embodiment, the decoupling voltage divider network includes resistor R and capacitor C. For example, the value for C is typically several nF with an RC time constant of 1 ns or less. In other embodiments, as discussed with reference to FIG. 11, Vccdrvn is replaced with power or ground connections.

Referring back to FIG. 3, in one embodiment the low-side switch $203_{l1}$ comprises cascode N-devices. In one embodiment, the cascode N-devices are NMOS transistors MN1 and MN2, where the drain terminal of MN1 is coupled to the output node Vx which is coupled to one end of the inductor 204. In one embodiment, the source terminal of MN1 is coupled to the drain terminal of MN2. In this embodiment, the source terminal of MN2 is coupled to Vsxin. In one embodiment, Vsxin is coupled to ground. In other embodiments, Vsxin is powered with a low power supply substantially close to ground. In one embodiment, the gate terminal of MN1 is driven by the signal "gn" from the NMOS bridge driver $202_{l1}$. In one embodiment, the NMOS bridge driver $202_{n1}$ monitors the voltage level of "cn" to determine when to turn on or off MN2 via signal "gn."

In one embodiment, the NMOS bridge driver $202_{n1}$ receives Vccdrvn, which is half-rail of Vccin. In one embodiment, Vccdrvn is used as a high power supply (e.g., 0.7-2V) for the NMOS bridge driver $202_{n1}$ while Vsxin is used as a low power supply (e.g., 0-0.1V).

In one embodiment, signals "ddp," "dp," and "enp" are bridge control signals from the bridge controller $201b_1$ to control the timing of the PMOS bridge driver $202_{p1}$. In one embodiment, the signals "ddn," "dn," and "enn" are bridge control signals from the bridge controller $201b_1$ to control the timing of the NMOS bridge driver $202_{n1}$. In one embodiment, the control signals ensure that the PMOS bridge driver $202_{p1}$ and the NMOS bridge driver $202_{n1}$ do not turn on the high-side switch $203h1$ and low-side switch $20311$ simultaneously.

The signals "ddp," "dp," "enp," "ddn," "dn," and "enn" are collectively referred to as 206. The signal "ddp" herein refers to delayed version of signal "dp." The signal "ddn" herein refers to delayed version of signal "dn." The signals "enp" and "enn" herein refer to enable signals to enable or disable the PMOS bridge driver $202_{p1}$ and the NMOS $202_{n1}$ bridge driver respectively. The timing of the control signals and the operation of the switchable voltage regulator 106 is discussed with reference to FIGS. 9A-B.

Referring back to FIG. 3, in one embodiment when the high-side switch $203_{h1}$ is on and the low-side switch $203_{l1}$ is off, the voltage on node Vx is substantially equal to Vccin and a positive current flows through the inductor 204 in the direction of the capacitor 205 and charges the capacitor 205 providing Vcc 105 to the processor core(s) i.e., the load. When the control signals "dp" and "dn" assert i.e., transition from logical low to logical high level, the high-side switch $203_{h1}$ turns off because the voltage level of "gp" rises to turn off MP1. While the embodiments herein illustrate a particular sequence of transition of the control signals "dp" and "dn," it is appreciated that the logic can be changed to accommodate complementary transition events without changing the essence of the embodiments.

In one embodiment, as signal "dp" begins to rise (as mentioned herein, "dn" and "dp" have similar timing characteristics), the voltage on the node "gp" begins to rise causing MP1 to turn off, causing the high-side switch $203_{h1}$ to turn off. In such an embodiment, the voltage on node "gn" begins to rise as the voltage on node "cn" begins to fall, turning on MN2. As MN2 turns on, the voltage on the node Vx begins to fall from Vccin level to Vsxin level. As the voltage on the node Vx begins to discharge, current reversal takes place.

The term "current reversal" herein generally refers to the change in flow of the current in the inductor 204. For example, when current in the inductor 204 begins to flow away from the capacitor 205 towards the low-side switch $203_{l1}$, current reversal has taken place.

In one embodiment, the reverse current (from the inductor to the low-side switch $203_{l1}$) begins to charge up the node Vx from Vsxin level towards Vccin level. As the node Vx begins to charge up, the voltage on the node "cn" begins to rise (which was previously substantially equal to Vsxin level). As the voltage on the node "cn" charges, the NMOS bridge driver $202_{p1}$ begins to raise the voltage of "gn" causing MN2 to turn off. During this time, MP1 begins to turn on as the voltage on the node "cp" begins to rise due to reverse current flow from the inductor 204. In this embodiment, since the output node Vx is initially charged up above Vxsin level due to the reverse current, the PMOS bridge driver $202_{p1}$ can be turned on a bit late i.e., MP1 is turned on a bit later than necessary so that it may charge up the node Vx to Vccin level without having to charge up Vx from Vsxin level to Vccin level.

In one embodiment the reverse current allows the bridge drivers to soft-switch their respective low-side and high-side switches. During soft-switching reverse inductor current is used to pre-charge the output node coupled to the inductor so that the low-side or high-side switches can be turned on later than needed, thus saving power consumption.

In this embodiment, the reverse current results in power savings because turning on of the high-side switch $203_{h1}$ can be delayed which in turn results in power savings—the reverse current is used to initially charge up the node Vx so that MP1 does not have to turn on early (and consume more power) to charge the node Vx from Vsxin level. Such charging up of node Vx by the reverse current and then by MP1 is referred herein as soft switching. In this embodiment, magnetic energy from the inductor is converted into electric energy to charge up node Vx and so the operation of the external source of energy (e.g., high-side switch $203_{h1}$) can be delayed to save overall power consumption of the voltage regulator.

In one embodiment, a difference in time "tdp" between the de-assertion of signals "dp" and "ddp" is used to initiate hard switching. For example, if MP2 is turned on late and Vx has still not charged up to Vccin level i.e., soft switching has not completed yet, the PMOS driver causes the voltage on the node "gp" to lower to turn on MP1 so that Vx node is charged up to Vccin level. Such switching is referred to as hard switching. Hard switching is used to ensure that the node Vx switches from Vsxin level to Vccin and vise-a-versa when soft switching does not complete the voltage switch on node Vx or when the time "tdp" expires. In one embodiment, the time "tdp" is programmable by software or hardware.

In one embodiment, MP1 is turned on by the PMOS driver $202_{p1}$. In one embodiment, the voltage on node "cp" starts to rise when Vx rises one PMOS threshold Vt (that of MP2) above Vccdrvn (half rail of Vccin). In this embodiment, the PMOS driver $202_{p1}$ turns on MP1 when voltage on node "cp" rises one NMOS Vt (that of MN5 in FIG. 5) above Vccdrvn. In one embodiment, MN2 is turned on by the NMOS driver $202_{n1}$ when the voltage on node "cn" falls by one transistor threshold below Vccdrvn (half rail of Vccin). In one embodiment, the voltage on node "cn" drops when Vx falls a Vt (of MN1) below Vccdrvn, and the NMOS driver $202_{n1}$ turns on MN2 when the voltage on node "cp" drops a Vt (of MP3 in FIG. 4) below Vccdrvn. In the embodiments discussed herein, the circuit topology of the DC-DC converter 300 and timing of the control signals 206 result in a self-timed circuit with a fast control loop which is insensitive to process and current variations.

Figure 4:
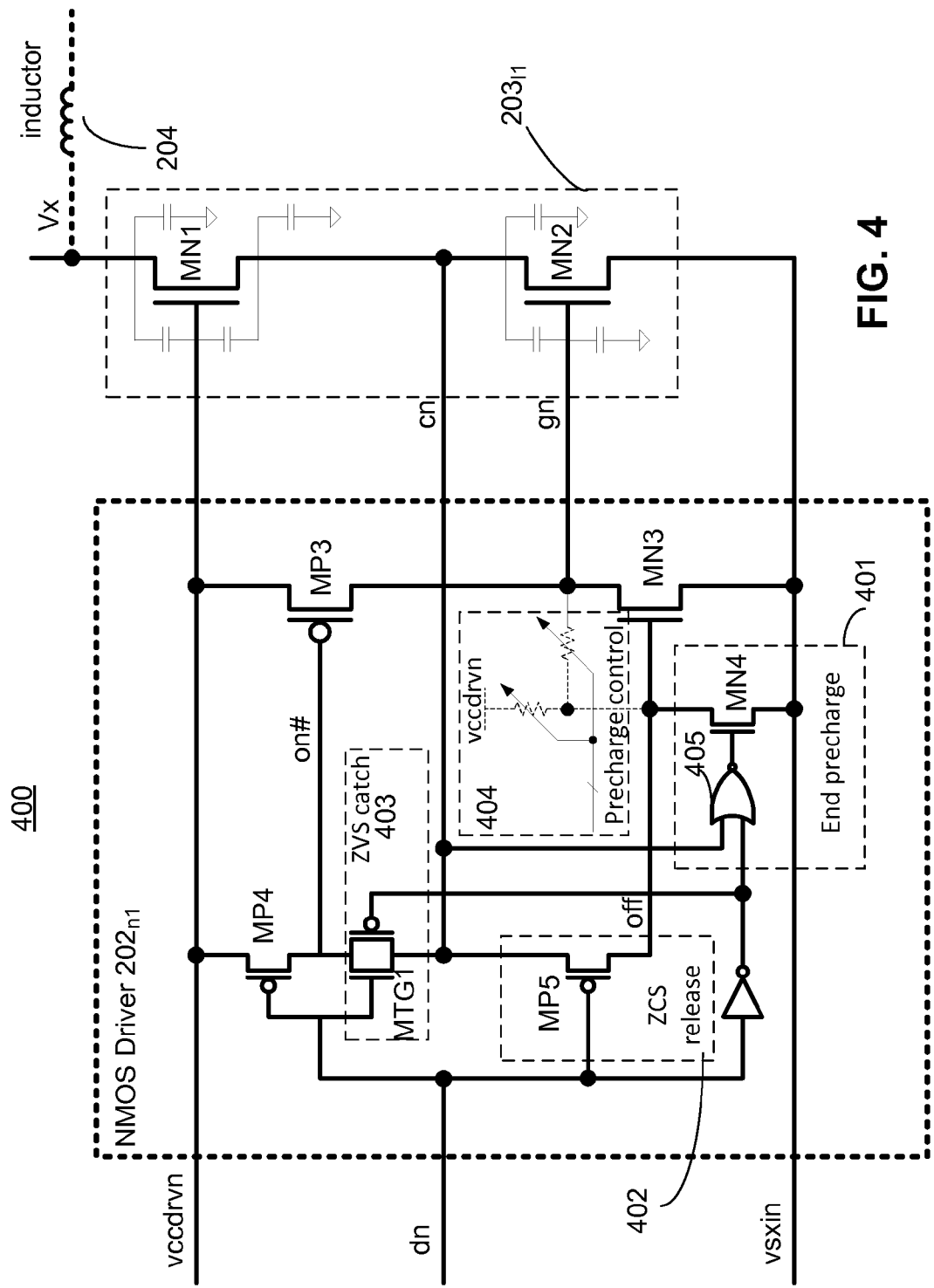
FIG. 4 is an N-type bridge driver for driving the low-side bridge switch, according to one embodiment of the disclosure.

FIG. 4 is a portion 400 of the regulator 106 comprising an N-type bridge driver $202_{n1}$ for driving the low-side switch $203_{l1}$, according to one embodiment of the disclosure. FIG. 4 is described with reference to FIGS. 1-3 and FIGS. 6-9.

In one embodiment, the NMOS driver $202_{n1}$ comprises a push-pull circuit including a pull-up p-type transistor MP3 coupled to a pull-down n-type transistor MN3 to generate signal "gn" to drive the gate terminal of the n-type transistor MN2. In one embodiment, the NMOS driver $202_{n1}$ further comprises an end-pre-charge circuit 401, a zero-current switching (ZCS) release circuit 402, a zero-voltage switching (ZVS) catch circuit 403, and a pre-charge control circuit 404. The embodiment of the NMOS driver $202_{n1}$ illustrates a functional model of the end-pre-charge circuit 401, ZCS release circuit 404, ZVS catch circuit 403, and the pre-charge control circuit 404. Various implementations of these circuits are possible and some embodiments are shown with reference to FIGS. 6-8.

Referring back to FIG. 4, in one embodiment the ZVS catch circuit 403 comprises a transmission gate MTG1 coupled to a PMOS transistor MP4. The transmission gate MTG1 comprises an n-type transistor coupled in parallel to the p-type transistor such that the source/drain terminals of the n-type and p-type transistors are coupled together, while their gate terminals may receive complementary signals. In another embodiment, the transmission gate MTG1 may be replaced with a pass-gate. For example, an n-type transistor pass-gate or a p-type transistor pass-gate may be used instead of or in conjunction with the transmission gate MTG1.

In one embodiment, the ZVS catch circuit 403 turns on the low-side bridge device MN2 via the signal "on#" when the bridge output Vx approaches close to zero or Vsxin. In one embodiment, MTG1 and MP4 of the ZVS catch circuit 403 are activated by means of the control signal "dn" generated by the bridge controller $201b_1$. For example, when "dn" is of logical high level, the ZVS catch circuit 403 is activated i.e., turned on. The ZVS catch circuit 403 implements Zero-Voltage-Switching on the falling transient i.e., when the voltage on Vx drops substantially close to zero volts. In one embodiment, the bridge output Vx is sensed via the voltage on the node "cn," which is close to Vx (e.g., a threshold voltage below Vx).

In one embodiment, the ZCS release circuit 402 comprises at least one p-type transistor MP5 coupled to the ZVS catch circuit 403. In one embodiment, the ZCS release circuit 402 turns off the low-side bridge device MN2 via the "off" signal when the bridge output Vx rises above a threshold voltage. In one embodiment, the control signal "dn" is used to activate the ZCS release circuit 402. For example, when "dn" is at logical low level, the ZCS release circuit 402 is activated and MP5 turns on when "cn" rises, and MN3 turns on when the "off" signal exceeds the threshold voltage. In one embodiment, "ddn" signal may turn off MN2 by turning on MN3 before the bridge output Vx rises above a threshold voltage (Vtn of MN3) when "dn" is at logical low level. As mentioned herein, signal "ddn" is a delayed version of signal "dn." In one embodiment, when "ddn" approaches or reaches logical low level (and dn is low already), then MPr1 and MPr3 pull the node "off" to a logic high level i.e., Vccdrvn, which then turns on MN3. In one embodiment, the ZCS release circuit 402 implements Zero-Current-Switching on the rising transient i.e., when the direction of the current through the inductor 204 reverses and flows from the capacitor 205 towards MN1. In this embodiment, the voltage on the node Vx is sensed via the voltage on node "cn" as discussed with reference to the ZVS catch circuit 403.

Figure 6:
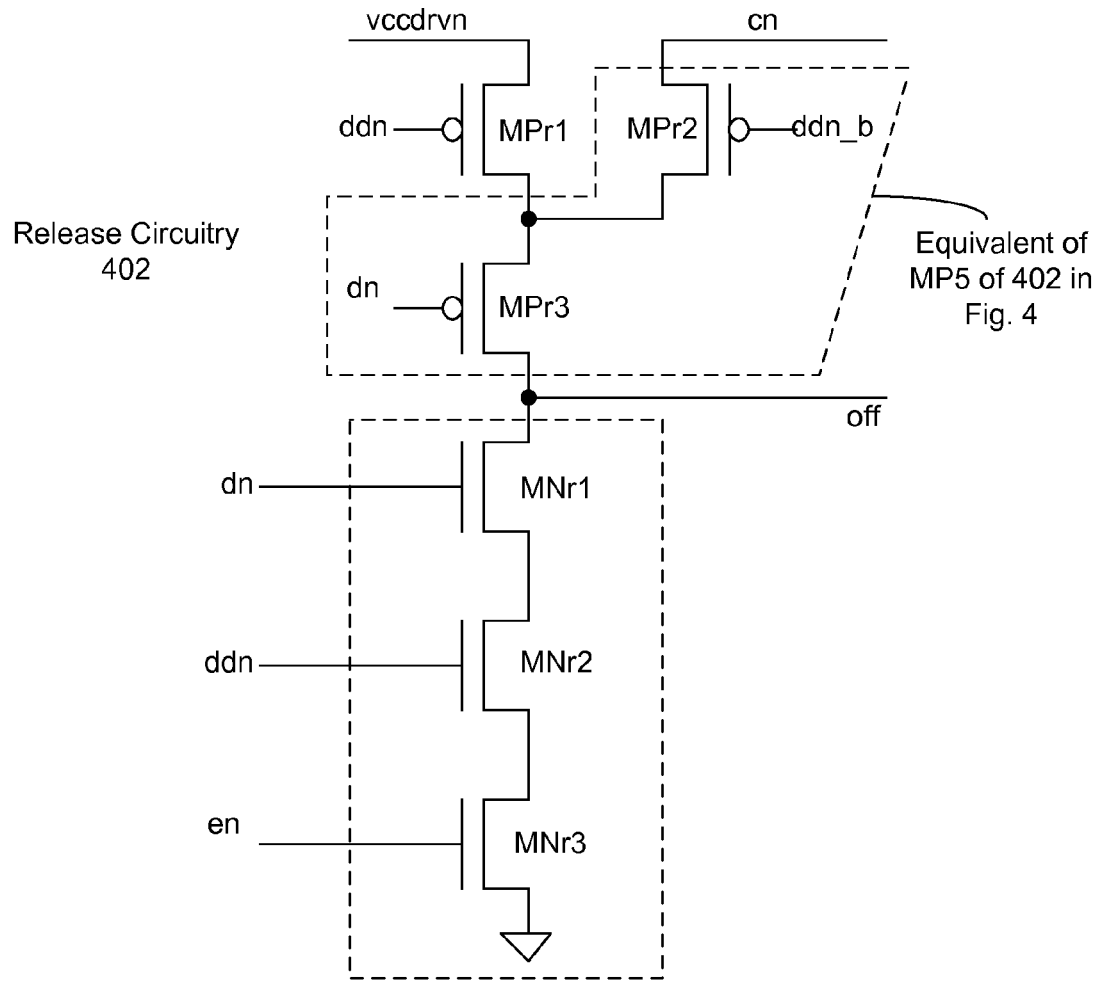
FIG. 6 is a release circuit of the N-type bridge driver to turn off the N-type bridge driver, according to one embodiment of the disclosure.

FIG. 6 is a ZCS release circuit 402 of the N-type bridge driver $202_{n1}$, according to one embodiment of the disclosure. The term "release" herein generally refers to turning off of a circuit.

In this embodiment, the ZCS release circuit 402 comprises a stack of n-type devices MNr1, MNr2, and MNr3 coupled together in series as shown, where the gate terminal of MNr1 is controlled by signal "dn," the gate terminal of MNr2 is controlled by "ddn" (a delayed version of "dn"), and the gate terminal of MNr3 is controlled by an enable signal "en." In one embodiment, the n-type devices MNr1, MNr2, and MNr3 are NMOS transistors. The signal "en" is used to enable or disable the operation of the ZCS release circuit 402. While the embodiment herein show a stack of three n-type devices, the number of n-type devices in the stack can change to adjust the release function.

In this embodiment, the ZCS release circuit 402 further comprises p-type transistors MPr1, MPr2, and MPr3, where the gate terminal of MPr1 is controlled by the signal "ddn," the gate terminal of MPr3 is controlled by "dn," and the gate terminal of MPr2 is controlled by the inverse of signal "dd_n" i.e., "ddn_b." In one embodiment, the p-type transistors MPr1, MPr2, and MPr3 are PMOS transistors. In this embodiment, the drain terminal of MPr1 is coupled to Vccdrvn (half rail) while the drain terminal of MPr2 is coupled to "cn." In this embodiment, the source terminals of MPr1 and MPr2 are coupled together and also to the source terminal of MPr3. In this embodiment, the drain source terminal of MPr3 is coupled to the drain terminal of MNr1 to generate the signal "off." In one embodiment, the release circuit 402 keeps the "off" signal at ground so long as "en," "dn," and "ddn" are at logic high levels. In one embodiment, when "dn" is at a logic low level while "ddn" is still at logical high level (hence, "ddn_b" is at a logic low), then the "off" signal is coupled to "cn" via MPr2 and MPr3 as soon as the voltage on node "cn" rises above the threshold of MPr3, which then turns on MN3 and thus turns off MN2 as soon a "Vx" rises above the threshold of MN3. In one embodiment, when both "ddn" and "dn" are at logical low levels, then "off" is raised to logical high level via MPr1 and MPr3. In this embodiment, MN2 turns off even if Vx is not rising.

Referring back to FIG. 4, in one embodiment the pre-charge control circuit 404 comprises a falling-edge pre-charge circuit and a rising-edge pre-charge circuit. In one embodiment, the falling-edge pre-charge circuit provides a falling-edge pre-charge phase to the MN2 gate voltage "gn" to cause the voltage on the node "gn" to rise to some voltage between Vsxin (substantially close to zero volts) and threshold voltage (e.g., Vtn of an NMOS transistor) until the bridge output Vx drops. One technical effect of the falling-edge pre-charge circuit is to reduce undershoot at node Vx during high currents. High currents are generally more than twice the normal load current.

In one embodiment, the NMOS bridge driver $202_{n1}$ comprises an end-pre-charge circuit 401 with a NOR gate 405 and an NMOS transistor MN4 which is operable to terminate the falling-edge pre-charge process when the voltage on the node Vx drops below approximately Vccdrvn/2. In this embodiment, the NOR gate 405 generates a control signal for the gate terminal of MN4 by performing a logical NOR operation on the signals "cn" and "dn_b" (inverted version of signal "dn").

In one embodiment, the rising-edge pre-charge circuit provides a rising-edge pre-charge phase to the MN2 gate voltage "gn" to cause "gn" to rise to some voltage between Vsxin (substantially close to zero volts) and Vt until the bridge output Vx rises above Vccdrvn/2. In this embodiment, the control signal "ddn" (delayed version of signal "dn") may be used to end the pre-charge process before the voltage Vx begins to rise above Vccdrvn/2. In one embodiment, the rising-edge pre-charge circuit terminates when the voltage on Vx crosses Vccdrvn/2, i.e., the gates' trip point. In one embodiment, the ZCS/release circuit forces the "off" node to logical high level as soon as Vx crosses Vt i.e., before the pre-charge circuit disengages.

One technical effect of the rising-edge pre-charge circuit is to reduce undershoot at node Vx during high currents. In one embodiment, the rising-edge pre-charge circuit is activated with the rising edge of Vx while the falling-edge pre-charge circuit is activated with the falling edge of Vx. The two pre-charge circuits allow for customized pre-charge levels for rising and falling edges of Vx. In one embodiment, the rising-edge pre-charge circuit and the falling-edge pre-charge circuit have adjustable pre-charge drive strength which may be determined by resistance associated with the rising and falling edge pre-charge circuits. For example, the pre-charge process may be slowed down by increasing the resistance in that pre-charge circuit that pre-charges node "gn."

In the embodiments discussed herein soft switching occurs on the falling edge i.e., when the low side switch $203_{l1}$ is turned on. During the falling edge transient when "dn" is initially at logical low level, the initial voltage on the node "cn" is Vccdrvn, the initial voltage of "on#" is unknown because "dn" is logically low causing the ZVS catch circuit 403 to be in high impedance due to MTG1 being off and so MP3 is also off, the ZCS release circuit 402 is on because dn=0 causes MP5 to turn on and so MN3 which was initially on (i.e., "gn" was a logical low) begins to turn off. During the initial falling edge transient when "dn" is initially at logical low level, MN2 is also off because the voltage on node "gn" is at logically low level.

As signal "dn" transitions from logical low level to logical high level, MTG1 turns on which activates the ZVS catch circuit 403. As the voltage on the node "cn" falls i.e., the voltage on "cn" is approximately Vccdrvn-Vtn, then the signal "on#" follows "cn" because MP4 is off while MTG1 is on. In this embodiment, the voltage level of "cn" is low enough to cause MP3 to slowly turn on pulling the node "gn" high which in turn causes MN2 to turn on. When MN2 turns on, the voltage on node Vx begins to fall resulting in a falling edge on the node Vx. In this embodiment, the low side switch $203_{l1}$ starts to conduct current through the inductor 204 from the node Vxsin (e.g., ground) to the node Vx. In this embodiment, the miller capacitance between the node "gn" and the drain terminal of MN2 i.e., "cn," delays the turn on event of MN2 which further reduces undershoot on node Vx.

One reason for reducing undershoot on node Vx is to improve reliability of the devices of the voltage regulator, avoid latch up, and avoid minority injection into the substrate. The magnitude of undershoot on node Vx is controlled by the ZVS catch circuit 403 which indirectly causes MN2 to be in sub-threshold (not fully on) region.

During falling-edge pre-charge, MN3 is biased so that it is weakly turned on as opposed to a strong on caused by a logical high level on the "off" node. Initially, when signal "dn" is logically low, the voltage on the node "off" is logically high because MP4 of the ZCS release circuit 402 is on. A logical high on the node "off" causes the transistor MN3 (pull-down transistor) to be strongly on resulting in a logical low voltage on the node "gn" causing MN2 to be off. During the falling edge transient when the signal "dn" is initially at logical low level, the initial voltage on the node "cn" is Vccdrvn, and the initial voltage on node "on#" is unknown because the signal "dn" is at logically low level causing the ZVS catch circuit 403 to be in high impedance state due to MTG1 being off, and so MP3 is also off.

As the signal "dn" transitions from logical low level to logical high level, MTG1 turns on which activates the ZVS catch circuit 403. As the voltage on the node "cn" falls i.e., the voltage on node "cn" is approximately Vccdrvn-Vtn, the signal "on#" follows "cn" because MP4 is off while MTG1 is on. The voltage level on the node "cn" is low enough to cause MP3 to slowly turn on, otherwise MP3 remains off. The voltage on the node "off" transitions from logical high level to about a threshold voltage of MN2 causing MN2 to weakly turn on. As the voltage on the node "off" falls from logical high (e.g., Vccdrvn) level to Vt, a conduction path is formed in the falling-edge pre-charge circuit causing the voltage on the node "gn" to rise from logical low (e.g., ground) to the threshold voltage (Vtn) of MN3. As the voltage on the node "gn" rises to Vtn, MN2 begins to conduct in sub-threshold region thus slowing the discharge of the voltage on node Vx to reduce undershoot.

As the voltage on the node "cn" falls close to Vsxin due to sub-threshold conduction of MN2, the end-pre-charge circuit is activated. As the voltage on node "cn" falls, the voltage on node "on#" (which is the same as "cn" because MTG1 is on) causes MP3 to fully turn on. The logical low level of the node "cn" causes MN4 to turn on via the NOR gate 405 which turns off MN3. When MN3 turns off, while MP3 is on, the voltage on the node "gn" is pulled to Vccdrvn level (logical high) causing MN2 to turn off. In this embodiment, the voltage on the node "off" is logical low which causes the pre-charge control circuit 404 to turn off the falling-edge pre-charge operation.

Figure 7:
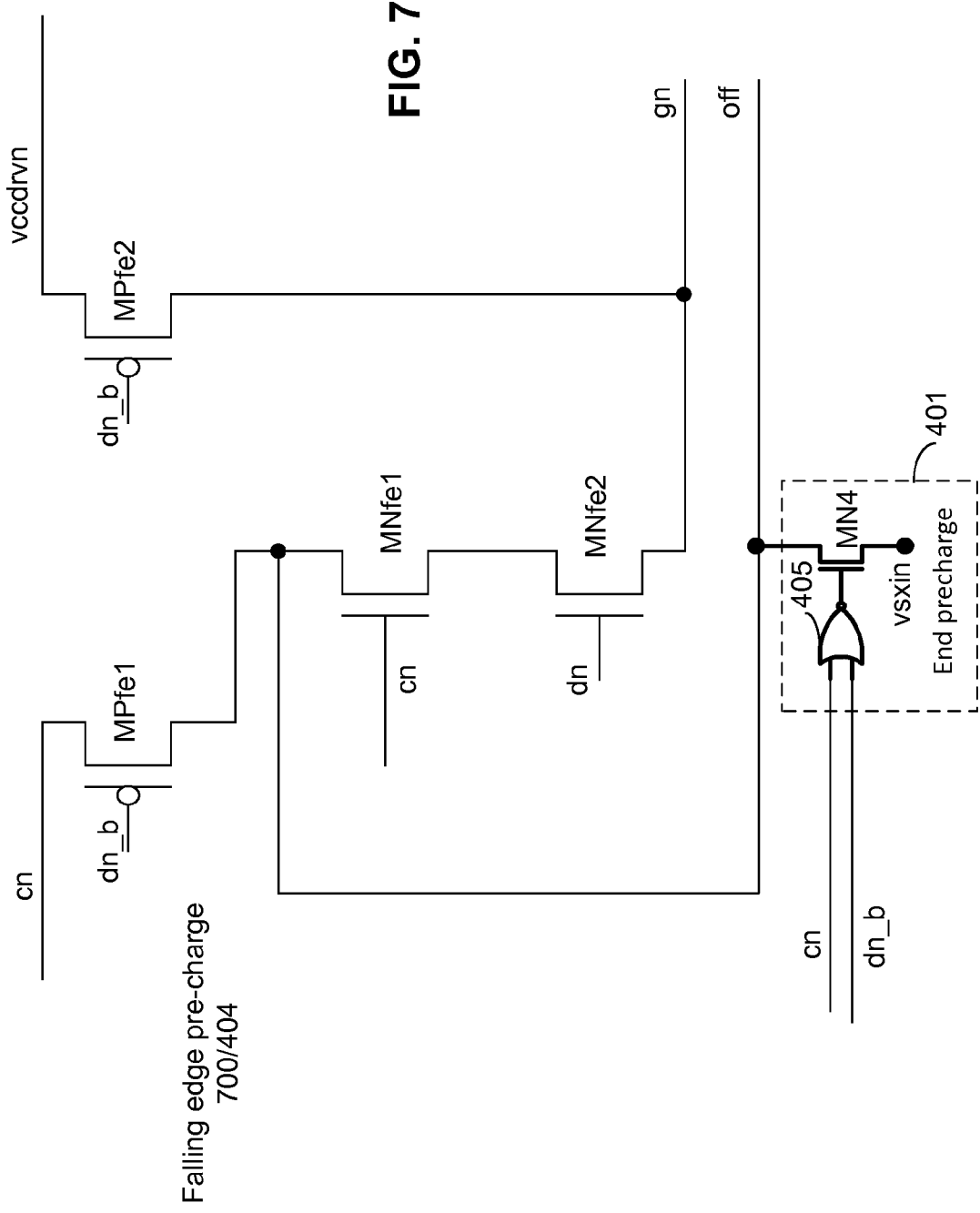
FIG. 7 is a falling-edge pre-charge circuit of the N-type bridge driver, according to one embodiment of the disclosure.

FIG. 7 is a falling-edge pre-charge circuit 700/404 of the N-type bridge driver $202_{n1}$, according to one embodiment of the disclosure. In this embodiment, the signal "off" is generated by MPfe1 which receives signal "dn_b" (inverted version of "dn") at its gate terminal, where the source terminal of MPfe1 is coupled to node "cn." The signal "gn" is adjusted by transistors MPfe2 and the resistance of transistors MNfe1 and MNfe2. In this embodiment, the n-type transistors MNfe1 and MNfe2 are coupled together in series such that the drain terminal of MNfe1 is coupled to node "off" and the drain terminal of MFfe1, and where the source terminal of MNfe2 is coupled to the node "gn." In this embodiment, the signal on node "cn" controls the gate terminal of MNfe1 while the signal "dn" controls MNfe2. In this embodiment, the source terminal of MPfe2 is coupled to Vccdrvn while the drain terminal of MFfe2 is coupled to the node "gn," where the gate terminal of MPfe2 is controlled by signal "dn_b." The end-pre-charge circuit 401 is coupled to the node "off" to end the pre-charge process automatically.

In one embodiment, the falling-edge pre-charge circuit 700/400 is shown in FIG. 7. In one embodiment, the falling-edge pre-charge circuit 700/400 is active whenever "dn" is at logical high level and "cn" is still at logical high level i.e., immediately before the falling edge. In one embodiment, the falling-edge pre-charge circuit 700/400 disengages as soon as the voltage on node "cn" drops below Vt (of MNfe1, MPfe1), except that MPfe2 (usually a weak device) remains on so long as dn is at logical high level.

Referring back to FIG. 4, in one embodiment the ZCS release circuit 402 is activated when "dn" transitions from logical high to logical low level causing MP5 to turn on. In such an embodiment, the voltage on node "cn" which is logical low causes the "off" node to follow "cn" which causes MN3 to turn off. As the signal "dn" transitions from logical high level to logical low level, MP4 turns on causing "on#" to be at logical high level which in turn causes MP3 to turn off. Since, both MN3 and MP3 are off, the voltage on node "gn" maintains its old voltage level, which is logical high causing MN2 to continue to remain on and then it slowly becomes weakly on because "gn" is not driven by any driver.

During rising edge transition on node Vx i.e., when the high-side switch $203_{h1}$ is about to turn on (but is still off), reverse current from the inductor 204 charges the node Vx through transistor MN2 (of the low-side switch $203_{l1}$) which is still on and in the process of turning off. At this time, the high side switch $203_{h1}$ is off and has not turned on to pull up the node Vx to a logical high level. In this embodiment, the signal "dn" logically switches from logical high level to logical low level.

So as not to obscure the embodiment, all the transients at various nodes are not discussed again. In this embodiment, the voltage on the node "gn" slowly discharges. The voltage on node "gn" which initially has logical high voltage level, transitions to a logical low voltage level (as the voltage on node "cn" rises) by first settling to a voltage level close to Vtn of MN3. In this embodiment, as the voltage on node "cn" rises to logical high level, MN3 turns off because the voltage on the node "off" rises from logical low level to logical high level. In one embodiment, this transition of the voltage on the node "off" is not immediate, but gradual as the voltage on node "off" also settles for a short duration at the Vtn level causing MN3 to weakly turn on.

As the voltage transients on the internal nodes ("cn," "off," "gn," "on#") settle, MN2 turns off because "gn" settles to a logical low level. At that time, the high-side switch $203_{h1}$ turns on pulling the voltage on the node Vx to a logical high level from an initially charged level caused by the reverse inductor current. In such an embodiment, the reverse inductor current saves power consumption by charging the node Vx using the magnetic energy of the inductor 204 to initially charge Vx and thus reducing the amount of energy required by the high-side switch $203_{h1}$ to charge up node Vx to a logical high level.

Figure 8:
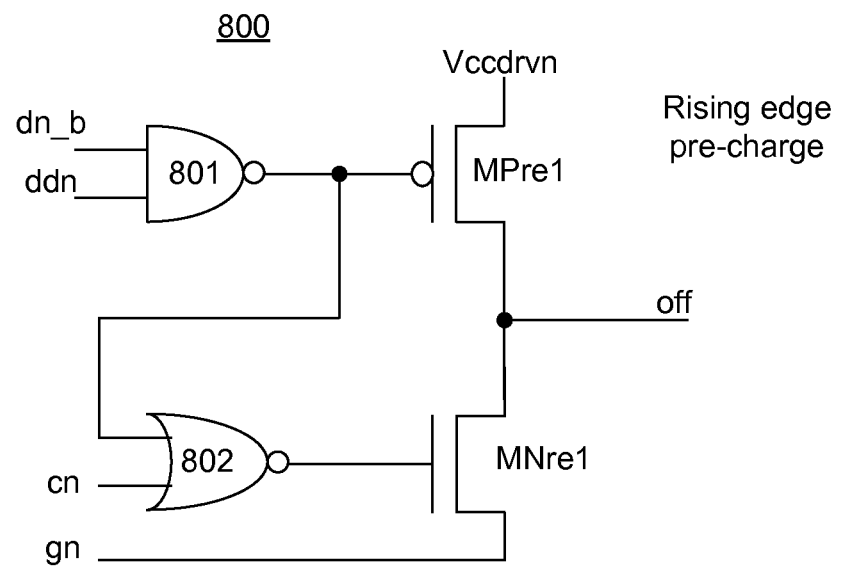
FIG. 8 is a rising-edge pre-charge circuit of the N-type bridge driver, according to one embodiment of the disclosure.

FIG. 8 is a rising-edge pre-charge circuit 800/402 of the N-type bridge driver, according to one embodiment of the disclosure. In one embodiment, the rising edge pre-charge circuit 800 comprises a push-pull circuit including a pull-up p-type transistor MPre1 coupled to a pull-down n-type transistor MNre1 as shown. In this embodiment, the source terminal of MPre1 coupled is coupled to Vccdrvn while the drain terminal is coupled to the node "off." In this embodiment, the source terminal of MNre1 is coupled to node "gn" while the drain terminal of MNre1 is coupled to the drain terminal of MPre1 and the node "off." In one embodiment the gate terminal of MPre1 is driven by a NAND gate 801 which performs a NAND operation between signal "dn_b" (inverted version of "dn") and signal "ddn" (delayed version of "dn"). In this embodiment, the gate terminal of MNre1 is driven by a NOR gate 802 which performs a NOR operation on signals "cn" and the output of the NAND gate 801. In one embodiment, the rising edge pre-charge circuit 800 is active whenever "dn" is at logical low level and "ddn" is at logical high level, and cn is still at logical low level i.e., immediately before the rising edge.

Figure 5:
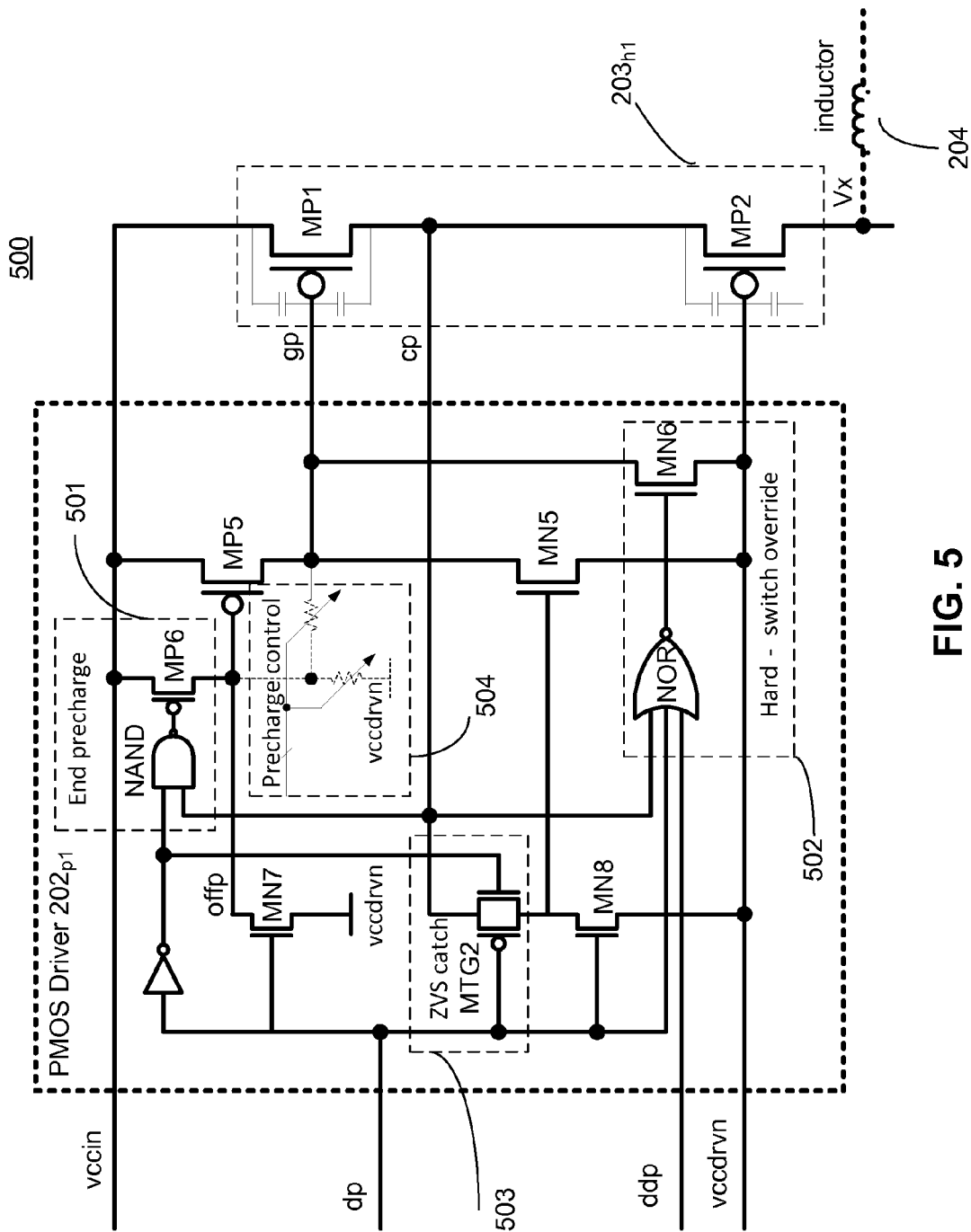
FIG. 5 is a P-type bridge driver for driving the high-side bridge switch, according to one embodiment of the disclosure.

FIG. 5 is a circuit 500 of a P-type bridge driver $202_{p1}$ for driving the high-side bridge $203_{h1}$, according to one embodiment of the disclosure. The P-type bridge driver $202_{p1}$ is a complementary version of the N-type bridge driver $202_{p1}$ discussed with reference to FIG. 4. So as not to obscure the embodiments of the invention, only the structure of the P-type bridge driver $202_{p1}$ is described. Functionally, circuit 500 is similar but complementary to circuit 400. For example, the P-type bridge driver $202_{p1}$ is used to drive a high-side switch for charging the node Vx while the N-type bridge driver $202_{n1}$ is used to drive a low-side switch for discharging the voltage on the output node Vx.

In one embodiment, the P-type bridge driver $202_{p1}$ comprises push-pull transistors, MP5 and MN5 respectively, an end-pre-charge circuit 501, a hard switch override circuit 502, a ZVS catch circuit 503, and a pre-charge control circuit 504 with a rising-edge pre-charge circuit and falling-edge pre-charge circuits.

In one embodiment of the P-type bridge driver $202_{p1}$, the pre-charge control circuit 504 and its associated rising/falling edge pre-charge circuits are similar in function, but complementary, in structure to the pre-charge control circuit 404 and its associated rising/falling edge pre-charge circuits discussed with reference to FIGS. 7-8. Referring back to FIG. 5, the push-pull transistors MP5 and MN5 have similar function as transistors MN3 and MP3 respectively of FIG. 4.

Referring back to FIG. 5, the ZVS catch circuit 503 comprises a transmission gate MTG2 coupled to transistors MN8 and MN5 as shown. The transmission gate MTG2 of FIG. 5 has similar function as MTG1 of FIG. 4. The transistor MN8 of FIG. 5 has similar function as MP5 of FIG. 4. The function of the ZVS catch circuit 503 is similar to the function of the ZVS catch circuit 403 of FIG. 4, but with complementary circuit structures.

Referring back to FIG. 5, the end-pre-charge circuit 501 comprises a NAND gate driving MP6. The end-pre-charge circuit 501 has similar function as the end-pre-charge circuit 401 of FIG. 4, but with complementary circuit structure.

Referring back to FIG. 5, the nodes "gp," "cp," "offp," "dp," and "ddp" correspond to the function of "gn," "cn," "off," "dn," and "ddn" respectively as discussed with reference to FIG. 4. Transistor MN7 of FIG. 5 performs similar function as MP4 of FIG. 4.

Referring back to FIG. 5, in one embodiment the hard switch override circuit 502 comprises a comparator logic and a pull-down transistor MN6 to pull down the voltage on the node "gp" to cause MP1 to turn on to switch the voltage on the node Vx. In one embodiment, the comparator logic comprises a NOR gate which performs a NOR operation on the signals "ddp," "dp," and "cp." In other embodiments, other logic gates may be used for performing the comparison function. In one embodiment, the condition for hard-switching on the rising transient is that both, "dp" and "ddp" are at logical low levels and "Vx" (i.e., "cp") has not yet risen above approximately (Vccin+Vccdrvn)/2.

Figure 9A:
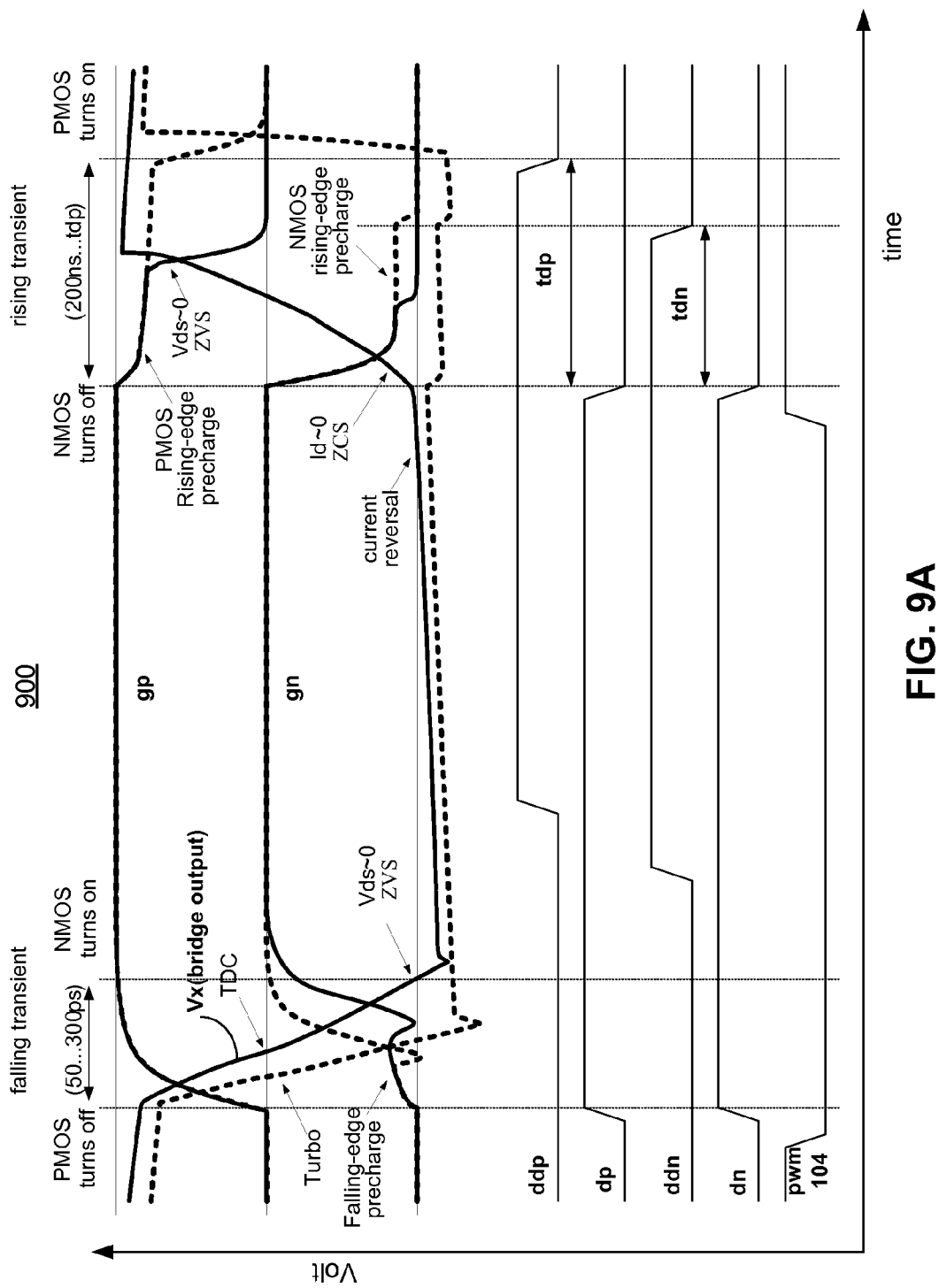
FIG. 9A shows waveforms illustrating the operation of various nodes of the switching voltage regulator, according to one embodiment of the disclosure.
Figure 9B:
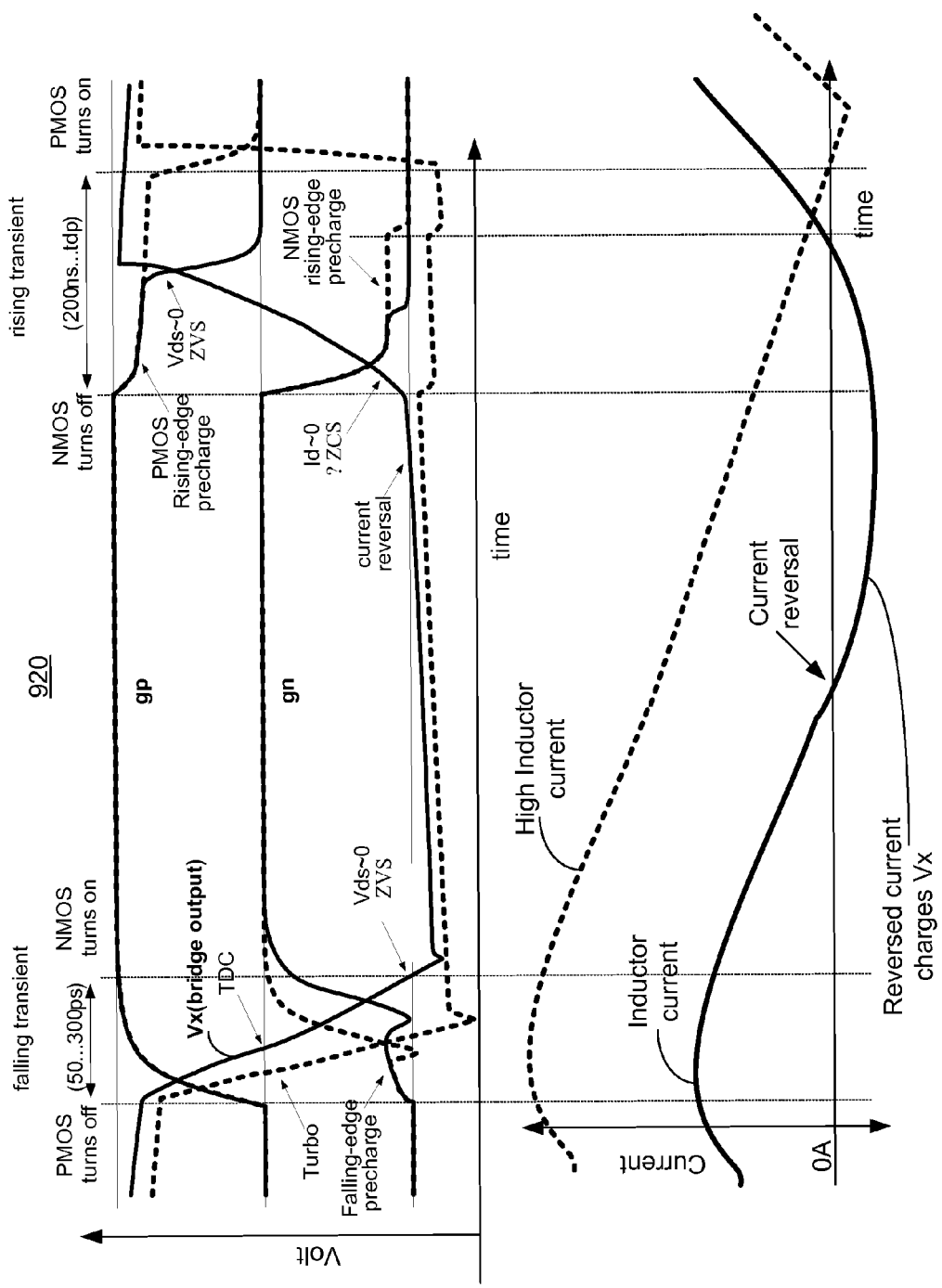
FIG. 9B waveforms illustrating the operation of various nodes of the switching voltage regulator, according to one embodiment of the disclosure.

FIGS. 9A-B provide some exemplary waveforms 900 and 920 illustrating the operation of various nodes of the switching voltage regulator 106, according to one embodiment of the disclosure. The time domain waveforms illustrated in FIGS. 9A-B begin with a falling transient on the node Vx followed by a rising transient on the node Vx.

In one embodiment, the control signals are generated according to the PWM signal 104 from the signal generator. For example, as the PWM signal 104 transitions, the signals "dp" and "dn" transition accordingly. The duty cycle of the PWM signal 104 determines the duty cycle of the signal on node Vx. The duty cycle of the signal on node Vx determines the regulated voltage level Vcc 105.

When the signals "dp" and "dn" assert i.e., transition from logical low level to logical high level, the high-side switch $203_{h1}$ turns off (PMOS turns off) and the output voltage on Vx begins to fall, the voltage on node "gp" begins to rise from Vccdrvn (half rail) to Vccin level, the voltage on node "gn" is initially at Vxsin level (e.g., ground) and is pre-charged by the falling-edge pre-charge circuit which is turned on by the pre-charge control circuit 404 of circuit 400.

As the node "gn" continues to rise, the voltage on node "Vx" continues to fall and the low-side switch $203_{l1}$ fully turns on causing the ZVS catch circuit 403 to activate to inhibit or reduce undershoot on the node Vx. During this time, the signals "ddp" and "ddn" are still at logical low level and then transition to a logical high level. The difference between the falling edge transitions of "ddp" and "dp" is referred as "tdp" while the difference between the falling transitions of "ddn" and "dn" is "tdn." In one embodiment, the time durations of both "tdp" and "tdn" are programmable by software or hardware. In one embodiment, the shorter in time "tdp" and "tdn" are, the earlier hard switching is activated. Likewise, when "tdp" and "tdn" are lengthened in time, hard switching is delayed.

In one embodiment, before or in the early phase of the rising transient, the low-side switch $203_{l1}$ begins to turn off and the voltage on the node "gn" falls from Vccdrvn level towards Vsxin. The high-side switch $203_{h1}$ is still off at that time and the node Vx is close to Vsxin level.

As discussed herein, current reversal takes place and current begins to flow from the inductor 204 to the low-side switch $203_{l1}$. The reverse current begins to charge up the node Vx. In this embodiment, the rising-edge pre-charge circuit in the high-side switch $203_{h1}$ activates and causes the voltage on the node "gp" to fall slightly to cause MP1 to turn on in sub-threshold region i.e., weak turn on. In this embodiment, the transistor MP1 is delayed from fully turning on so that the reverse current may charge the node Vx. By charging the node Vx by means of the reverse current and delaying the operation of fully turning on of MP1, power consumption is reduced.

In one embodiment, the ZCS release circuit 402 is activated to turn off the low-side switch transistor MN2. In this embodiment, the ZVS catch circuit 503 is also activated to prevent overshoot of the voltage on the node Vx. The voltage on the node "gp" then drops to Vxxdrvn level from Vccin level to turn on MP1 which then charges up Vx to Vccin level.

The dotted line waveforms illustrate the situation when the load current is high and hard switching is enabled to make sure that the node Vx charges and discharges in time to form a stable regulated voltage Vcc 105.

Figure 10:
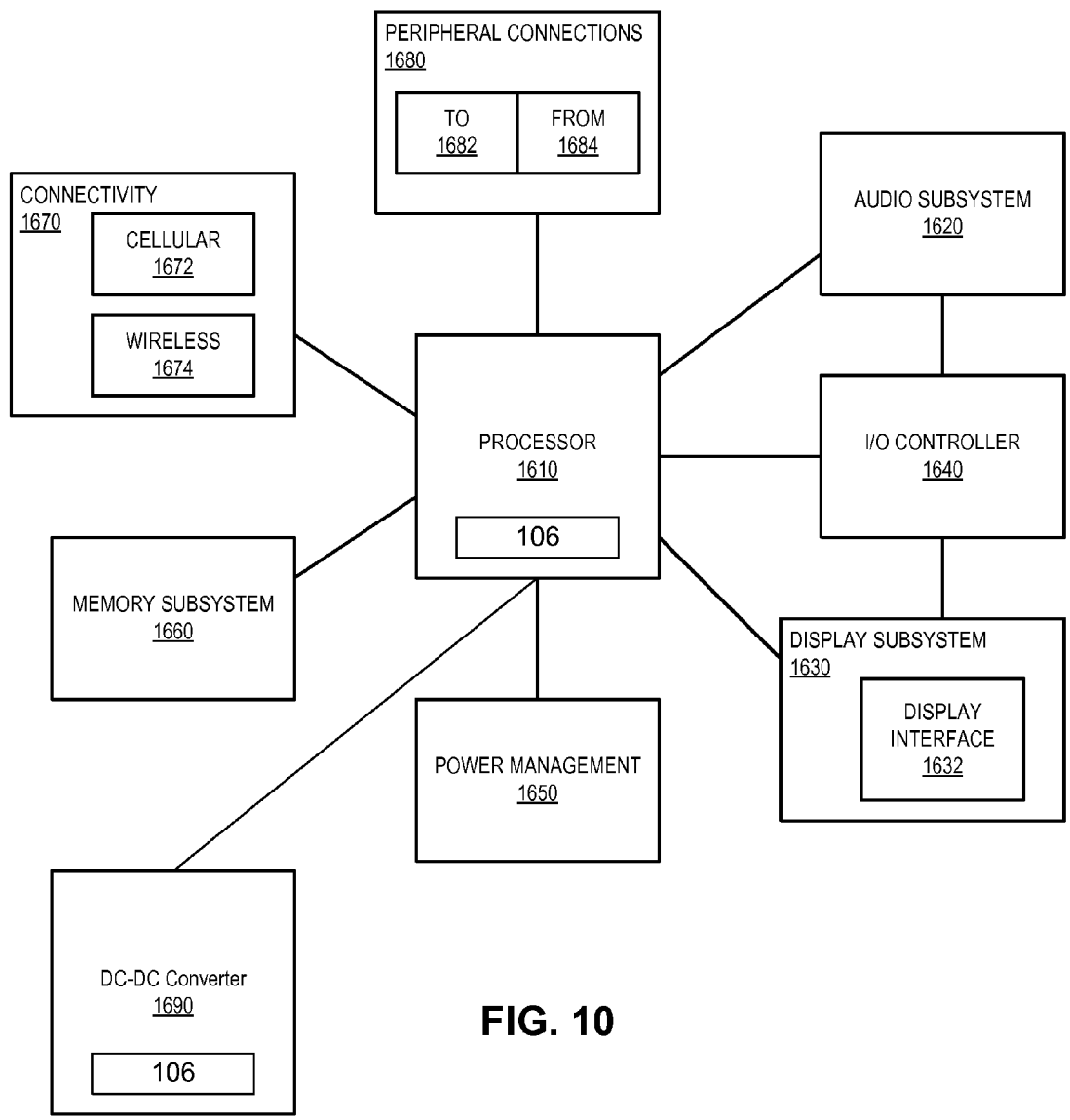
FIG. 10 is a system-level diagram of a smart device comprising a processor with the fully integrated switching voltage regulator, according to one embodiment of the disclosure.

FIG. 10 is a system-level diagram of a smart device comprising a processor 100 with the fully integrated switching voltage regulator 106, according to one embodiment of the disclosure. FIG. 10 also illustrates a block diagram of an embodiment of a mobile device in which flat surface interface connectors could be used. In one embodiment, the computing device 1600 represents a mobile computing device, such as a computing tablet, a mobile phone or smart-phone, a wireless-enabled e-reader, or other wireless mobile device. It will be understood that certain of the components are shown generally, and not all components of such a device are shown in device 1600.

In one embodiment, the computing device 1600 includes a first processor 1610 with the switchable voltage regulator 106 and a second processor 1690 with the switchable voltage regulator 106, according to the embodiments discussed herein.

The various embodiments of the present disclosure may also comprise a network interface within 1670 such as a wireless interface so that a system embodiment may be incorporated into a wireless device such as cell phone or personal digital assistant.

In one embodiment, the processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, the computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to device 1600 through which a user might interact with the system. For example, devices that can be attached to the computing device 1600 might include microphone devices, speaker or stereo systems, video systems or other display device, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of or in addition to display output. In another example, when the display subsystem includes a touch screen, the display device also acts as an input device, which can be at least partially managed by I/O controller 1640. There can also be additional buttons or switches on the computing device 1600 to provide I/O functions managed by I/O controller 1640.

In one embodiment, the I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, the computing device 1600 includes power management 1650 that manages battery power usage, charging of the battery, and features related to power saving operation. Memory subsystem 1660 includes memory devices for storing information in device 1600. Memory can include nonvolatile (state does not change if power to the memory device is interrupted) and/or volatile (state is indeterminate if power to the memory device is interrupted) memory devices. Memory 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The device could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 1674 refers to wireless connectivity that is not cellular, and can include personal area networks (such as Bluetooth, Near Field, etc), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on device 1600. Additionally, a docking connector can allow device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description.

Figure 11:
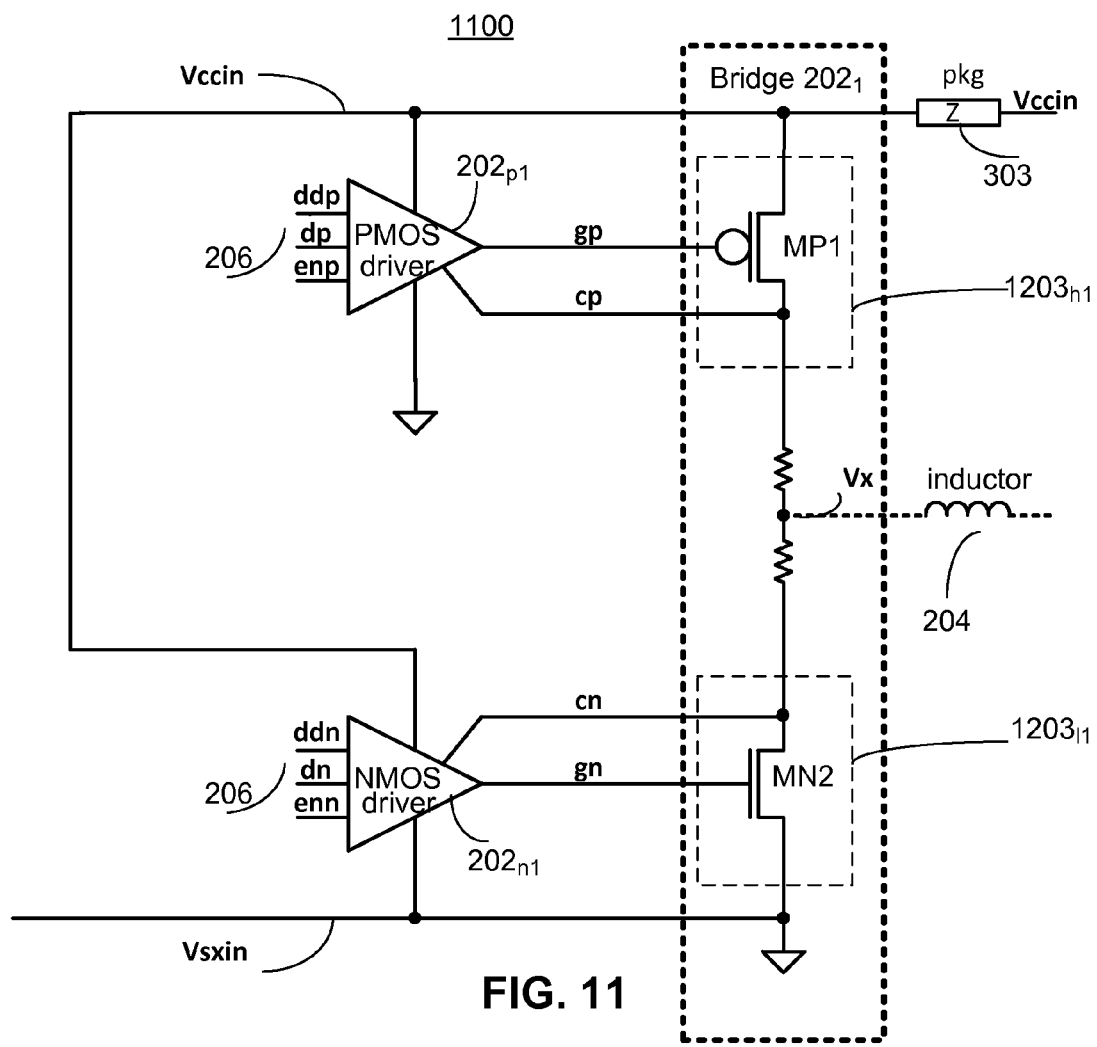
FIG. 11 is a portion of a switching voltage regulator with low-side and high-side switches and corresponding drivers, according to another embodiment of the disclosure.

One such alternative is shown in FIG. 11. FIG. 11 is a portion 1100 of a switching voltage regulator 106 with a low-side $1203_{n1}$ and a high-side $1203_{l1}$ switch with corresponding drivers $202_{p1}$ and $202_{n1}$ respectively, according to another embodiment of the disclosure. In this embodiment, the half-rail Vccdrvn is removed.

The embodiments of the disclosure are intended to embrace all such alternatives, modifications, and variations as to fall within the broad scope of the appended claims. In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented i.e., such specifics should be well within purview of one skilled in the art. Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment the apparatus comprises: a low-side switch coupled to an output node for providing regulated voltage supply; and a first driver operable to cause the low-side switch to turn off when the output node rises above a first transistor threshold voltage. In one embodiment, the apparatus further comprises a high-side switch coupled to the output node; and a second driver operable to cause the high-side switch to turn on when either the output node reaches a second transistor threshold voltage or when a control signal causes the high-side switch to turn on.

In one embodiment, the high-side switch comprises a cascode device including a first p-type transistor coupled to the output node and a second p-type transistor, wherein the second p-type transistor is driven by the second driver according to a voltage level on a node coupling the first p-type transistor to the second p-type transistor. In one embodiment, the second transistor threshold voltage corresponds to a threshold voltage of the first p-type transistor.

In one embodiment, the first driver operable to cause the low-side switch to turn on when the output node is substantially close to zero volts. In one embodiment, the low-side switch comprises a cascode device including a first n-type transistor coupled to the output node and a second n-type transistor, wherein the second n-type transistor is driven by the first driver according to a voltage level on a node coupling the first n-type transistor to the second n-type transistor. In one embodiment, the first transistor threshold voltage corresponds to a threshold voltage of the first n-type transistor. In one embodiment, the first driver comprises a zero-voltage catch circuit which is operable to indirectly sense a voltage on the output node to turn on the low-side switch.

In one embodiment, the first driver comprises a release circuit which is operable to indirectly sense a voltage on the output node to turn off the low-side switch. In one embodiment, the first driver comprises a pre-charge circuit to pre-charge a node driving the low-side switch. In one embodiment, the pre-charge circuit is operable to raise or keep substantially constant a voltage on the node driving the low-side switch to a voltage between ground and a threshold voltage of a transistor of the low-side switch. In one embodiment, the first driver comprises an end-pre-charge circuit to terminate the operation of the pre-charge circuit. In one embodiment, the second driver comprises a pre-charge circuit to pre-charge a node driving the high-side switch.

In one embodiment, the pre-charge circuit is operable to lower or keep substantially constant a voltage on the node driving the high-side switch to a voltage between power supply and a threshold voltage of a transistor of the high-side switch. In one embodiment, the second driver comprises an end-pre-charge circuit to terminate the operation of the pre-charge circuit. In one embodiment, the output node is coupled to one end of an inductor which has another end coupled to a capacitor. In one embodiment, the other end coupled to the capacitor to provide regulated voltage supply to a circuit.

In another example, a voltage regulator comprises: a signal generator to generate a pulse-width modulated (PWM) signal; a bridge having a low-side switch coupled to an output node for providing regulated voltage supply according to the PWM signal; a first driver operable to cause the low-side switch to turn off when the output node rises above a first transistor threshold voltage; and a bridge controller to provide control signals to the first driver.

In one embodiment, the bridge comprises a high-side switch coupled to the output node. In one embodiment, the voltage regulator further comprises: a second driver operable to cause the high-side switch to turn on when either the output node reaches a second transistor threshold voltage or when a control signal causes the high-side switch to turn on. In one embodiment, the bridge controller is operable to provide control signals to the second driver. In one embodiment, the voltage regulator is according to any one of apparatus discussed herein.

In another example, a system comprises: a wireless interface; and a processor, capable of communicating directly or indirectly with another device via the wireless interface, the processor including a voltage regulator, a low-side switch coupled to an output node for providing regulated voltage supply; and a first driver operable to cause the low-side switch to turn off when the output node rises above a first transistor threshold voltage. In one embodiment, the voltage regulator is according to any one of apparatus discussed herein.

In one embodiment, the processor comprises a plurality of hardware processing cores, and wherein at least one hardware processing core is coupled to a memory. In one embodiment, the system further comprises a memory coupled to the processor.

In another example, the apparatus comprising: means for activating a pre-charge circuit to pre-charge a node driving a low-side switch device of a voltage regulator; and means for turning on the low-side switch device when an output node coupled to the low-side switch device transitions from an input voltage supply level to a voltage supply level between half of the input voltage supply level and ground. In one embodiment, the apparatus further comprises means for turning off the low-side switch when the output node rises above a first transistor threshold voltage. In one embodiment, the apparatus further comprises means for turning on a high-side switch device when a voltage on the output node rises above a half of the input voltage supply level. In one embodiment, the apparatus further comprises means for terminating the pre-charge circuit from pre-charging the node driving the low-side switch device prior to the output node beginning to charge. In one embodiment, the output node is coupled to one end of an inductor which has another end coupled to a capacitor. In one embodiment, the other end coupled to the capacitor to provide regulated voltage supply to a circuit.

In another example, a voltage regulator comprises: a low-side switch coupled to an output node and a first supply; a high-side switch coupled to the output node and second supply, the second supply being higher than the first supply; an inductor with a first end coupled to the output node and a second end coupled to a capacitor, wherein the low-side switch is operable to boast voltage on the output node through reverse current from the inductor, and wherein the high-side switch is operable to charge up the boasted output voltage node. In one embodiment, the voltage regulator operates at frequencies of 100 MHz or higher.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising: a low-side switch coupled to an output node for providing regulated voltage supply; a first driver operable to cause the low-side switch to turn off when the output node rises above a first transistor threshold voltage; a high-side switch coupled to the output node; and a second driver operable to cause the high-side switch to turn on when either the output node reaches a second transistor threshold voltage or when a control signal causes the high-side switch to turn on, wherein the high-side switch comprises a cascode device including a first p-type transistor coupled to the output node and a second p-type transistor, wherein the second p-type transistor is driven by the second driver according to a voltage level on a node coupling the first p-type transistor to the second p-type transistor.

2. The apparatus of claim 1, wherein the second transistor threshold voltage corresponds to a threshold voltage of the first p-type transistor.

3. The apparatus of claim 1, wherein the first driver operable to cause the low-side switch to turn on when the output node is substantially close to zero volts.

4. An apparatus comprising: a low-side switch coupled to an output node for providing regulated voltage supply; and a driver operable to cause the low-side switch to turn off when the output node rises above a first transistor threshold voltage, wherein the low-side switch comprises a cascode device including a first n-type transistor coupled to the output node and a second n-type transistor, wherein the second n-type transistor is driven by the driver according to a voltage level on a node coupling the first n-type transistor to the second n-type transistor.

5. The apparatus of claim 4, wherein the first transistor threshold voltage corresponds to a threshold voltage of the first n-type transistor.

6. An apparatus comprising: a low-side switch coupled to an output node for providing regulated voltage supply; and a driver operable to cause the low-side switch to turn off when the output node rises above a first transistor threshold voltage, wherein the driver comprises a zero-voltage catch circuit which is operable to indirectly sense a voltage on the output node to turn on the low-side switch.

7. An apparatus comprising: a low-side switch coupled to an output node for providing regulated voltage supply; and a driver operable to cause the low-side switch to turn off when the output node rises above a first transistor threshold voltage, wherein the driver comprises a release circuit which is operable to indirectly sense a voltage on the output node to turn off the low-side switch.

8. An apparatus comprising: a low-side switch coupled to an output node for providing regulated voltage supply; and a driver operable to cause the low-side switch to turn off when the output node rises above a first transistor threshold voltage, wherein the driver comprises a pre-charge circuit to pre-charge a node driving the low-side switch.

9. The apparatus of claim 8, wherein the pre-charge circuit is operable to raise or keep substantially constant a voltage on the node driving the low-side switch to a voltage between ground and a threshold voltage of a transistor of the low-side switch.

10. The apparatus of claim 8, wherein the driver comprises an end-pre-charge circuit to terminate the operation of the pre-charge circuit.

11. An apparatus comprising: a low-side switch coupled to an output node for providing regulated voltage supply; a first driver operable to cause the low-side switch to turn off when the output node rises above a first transistor threshold voltage; a high-side switch coupled to the output node; and a second driver operable to cause the high-side switch to turn on when either the output node reaches a second transistor threshold voltage or when a control signal causes the high-side switch to turn on, wherein the second driver comprises a pre-charge circuit to pre-charge a node driving the high-side switch.

12. The apparatus of claim 11, wherein the pre-charge circuit is operable to lower or keep substantially constant a voltage on the node driving the high-side switch to a voltage between power supply and a threshold voltage of a transistor of the high-side switch.

13. The apparatus of claim 11, wherein the second driver comprises an end-pre-charge circuit to terminate the operation of the pre-charge circuit.

14. The apparatus of claim 11, wherein the output node is coupled to one end of an inductor which has another end coupled to a capacitor.

15. The apparatus of claim 14, wherein the other end coupled to the capacitor to provide regulated voltage supply to a circuit.

16. A voltage regulator comprising: a signal generator to generate a pulse-width modulated (PWM) signal; a bridge having a low-side switch coupled to an output node for providing regulated voltage supply according to the PWM signal, wherein the bridge comprises a high-side switch coupled to the output node; a first driver operable to cause the low-side switch to turn off when the output node rises above a first transistor threshold voltage; a bridge controller to provide control signals to the first driver; a second driver operable to cause the high-side switch to turn on when either the output node reaches a second transistor threshold voltage or when a control signal causes the high-side switch to turn on, wherein the high-side switch comprises a cascode device including a first p-type transistor coupled to the output node and a second p-type transistor, wherein the second p-type transistor is driven by the second driver according to a voltage level on a node coupling the first p-type transistor to the second p-type transistor.

17. A system comprising: a wireless interface; and a processor, capable of communicating directly or indirectly with another device via the wireless interface, the processor including a voltage regulator, a low-side switch coupled to an output node for providing regulated voltage supply; a first driver operable to cause the low-side switch to turn off when the output node rises above a first transistor threshold voltage; a high-side switch coupled to the output node; and a second driver operable to cause the high-side switch to turn on when either the output node reaches a second transistor threshold voltage or when a control signal causes the high-side switch to turn on, wherein the high-side switch comprises a cascode device including a first p-type transistor coupled to the output node and a second p-type transistor, wherein the second p-type transistor is driven by the second driver according to a voltage level on a node coupling the first p-type transistor to the second p-type transistor.

18. An apparatus comprising:
   means for activating a pre-charge circuit to pre-charge a node driving a low-side switch device of a voltage regulator; and
   means for turning on the low-side switch device when an output node coupled to the low-side switch device transitions from an input voltage supply level to a voltage supply level between half of the input voltage supply level and ground.

19. The apparatus of claim 18 further comprises means for turning off the low-side switch when the output node rises above a first transistor threshold voltage.

20. The apparatus of claim 18 further comprises means for turning on a high-side switch device when a voltage on the output node rises above a half of the input voltage supply level.

21. The apparatus of claim 18 further comprises means for terminating the pre-charge circuit from pre-charging the node driving the low-side switch device prior to the output node beginning to charge.

22. The apparatus of claim 18, wherein the output node is coupled to one end of an inductor which has another end coupled to a capacitor.

23. The apparatus of claim 22, wherein the other end coupled to the capacitor to provide regulated voltage supply to a circuit.

24. A voltage regulator comprising:
   a low-side switch coupled to an output node and a first supply;
   a high-side switch coupled to the output node and second supply, the second supply being higher than the first supply;
   an inductor with a first end coupled to the output node and a second end coupled to a capacitor, wherein the low-side switch is operable to boost voltage on the output node through reverse current from the inductor, and wherein the high-side switch is operable to charge up the boosted output voltage node.

25. The voltage regulator of claim 24, wherein the first supply is ground and the second supply is power supply.

26. The voltage regulator of claim 24 further comprises a first driver operable to cause the low-side switch to turn off when the output node rises above a first transistor threshold voltage.

27. The voltage regulator of claim 26 further comprises a second driver operable to cause the high-side switch to turn on when either the output node reaches a second transistor threshold voltage or when a control signal causes the high-side switch to turn on.

28. The voltage regulator of claim 24, wherein the voltage regulator is operable at frequencies of 100 MHz or higher.

* * * * *